United States Statutory Invention Registration [19]

[11] Reg. Number: H149

Cawley [43] Published: Nov. 4, 1986

[54] ON-LINE TEMPERATURE SENSOR

[75] Inventor: William E. Cawley, Richland, Wash.

[73] Assignee: The United States of America as represented by the United States Department of Energy, Washington, D.C.

[21] Appl. No.: 635,022

[22] Filed: Jul. 27, 1984

[51] Int. Cl.[4] ..... G21C 17/00
[52] U.S. Cl. ..... 376/247
[58] Field of Search ..... 376/247; 374/124, 166, 374/167

[56] References Cited

U.S. PATENT DOCUMENTS

| | | | |
|---|---|---|---|
| 3,511,091 | 5/1970 | Thome | 376/247 |
| 3,716,450 | 2/1973 | Lions | 376/247 |
| 3,810,138 | 5/1974 | Thompson et al. | 376/247 |

FOREIGN PATENT DOCUMENTS

| | | | |
|---|---|---|---|
| 1119689 | 3/1982 | Canada | 374/167 |

*Primary Examiner*—Salvatore Cangialosi
*Attorney, Agent, or Firm*—Robert Southworth, III; Judson R. Hightower

[57] ABSTRACT

An on-line outlet temperature monitoring device to back up readings provided by stationary temperature detectors on individual process tubes in a nuclear reactor. The monitoring device includes a highly accurate temperature sensor that can be selectively coupled to the outlet end of any chosen process tube to verify temperature readings pertaining to that process tube. Specifically, the sensor is suspended in a movable enclosure that can be shifted into position about a supporting wall for the protruding ends of the process tubes. The movable sensor is used to back up readings provided by the stationary temperature detectors and to recalibrate the stationary temperature detectors so as to permit their use at lower tolerance limits.

3 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ON-LINE TEMPERATURE SENSOR

BACKGROUND OF THE INVENTION

This disclosure relates to an apparatus for remotely monitoring the operating temperatures of individual coolant process tubes in a nuclear reactor. It consists of a remotely movable temperature sensor that backs up normal usage of the temperature detectors associated with each tube. The United States Government has rights in this invention.

Process tube outlet temperatures are individually monitored during operation of pressure tube nuclear reactors, such as the N-Reactor at Hanford, Washington, by stationary Resistance Temperature Detectors associated with the outlet piping of each process tube. These Resistance Temperature Detectors occasionally fail due to the severe operating environment. In a reactor facility that includes one thousand or more process tubes, a significant number of Resistance Temperature Detectors might be found to be inoperative at any given time during reactor use. As a matter of operating routine, the individual Resistance Temperature Detectors are checked during reactor startup. If a Resistance Temperature Detector fails during reactor startup it is necessary that the reactor be shut down for replacement of the faulty temperature detector.

In order to effectively utilize Resistance Temperature Detectors in these critical applications, it has been found necessary to operate them under relatively wide tolerance limits. This requires that the coolant temperatures be lower than would be considered safe were a more accurate temperature sensing system to be utilized. This in turn adversely affects the reactor power plant's operational efficiency.

SUMMARY OF THE INVENTION

It is an object of the invention to provide a new and useful apparatus for backing up the operation of individual temperature detectors on each process tube of a reactor so that temperature signal produced by their use can be independently verified or corrected without modifying reactor operation or requiring replacement of the conventional temperature detectors.

Another object of this invention is to provide a reactor with a movable, well calibrated, temperature sensor of greater reliability and accuracy than the conventional temperature detectors, for periodically calibrating and backing up each temperature detector during reactor operation.

To achieve the foregoing and other objects, and in accordance with the purposes of the present invention as embodied and broadly described herein, the apparatus of this invention comprises a movable temperature sensor mounted near the shield wall of the reactor core supporting corresponding ends of the process tubes and remotely operated means operably connected between the shield wall of the reactor core and the movable temperature sensor for selectively coupling the movable temperature sensor to one end of a selected process tube to verify or correct readings provided by the stationary temperature detector associated with the process tube without modifying reactor operation or replacing the stationary temperature detector.

BRIEF DESCRIPTION OF THE DRAWINGS

The accompanying drawings, which are incorporated into and form a part of the specification, illustrate an embodiment of the present invention and, together with the description, serve to explain the principles of the invention. In the drawings.

DESCRIPTION OF A PREFERRED EMBODIMENT

Figure 1:
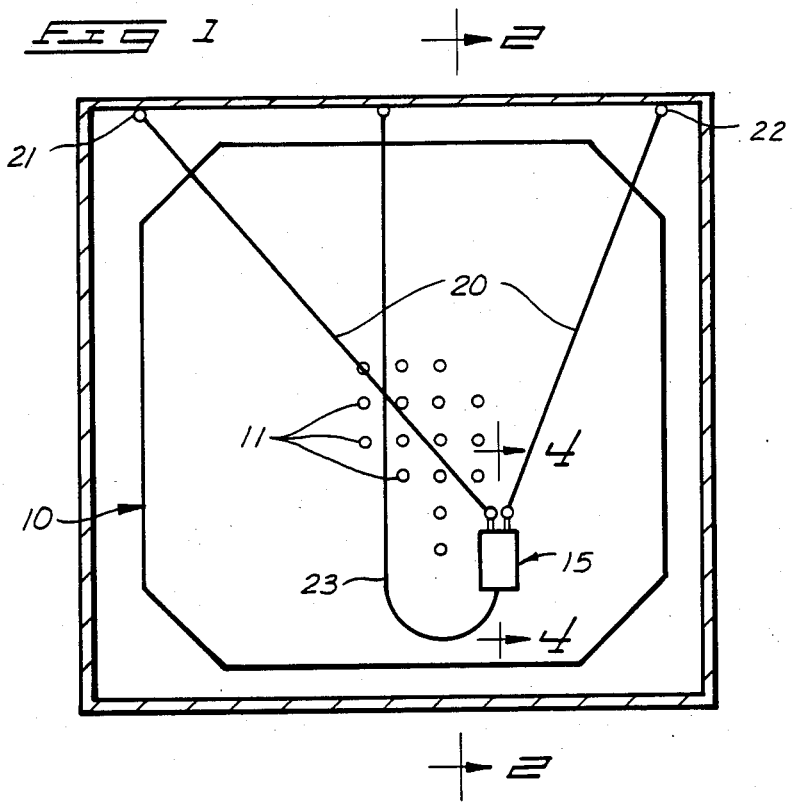
FIG. 1 is a simplified elevational view showing a vertical reactor shield wall with protruding process tube ends and a movable temperature sensor according to this disclosure.
Figure 2:
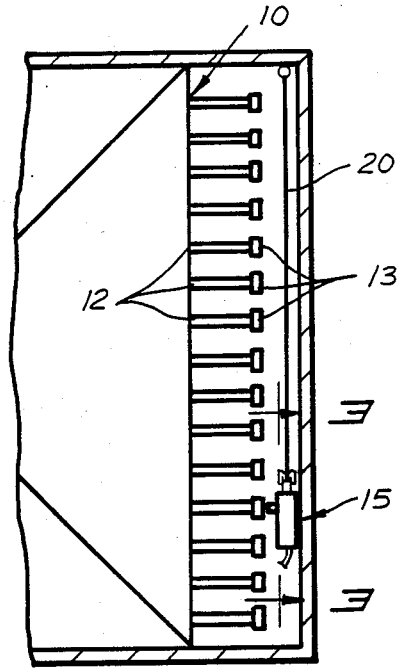
FIG. 2 is a sectional view taken essentially along line 2—2 in FIG. 1.
Figure 3:
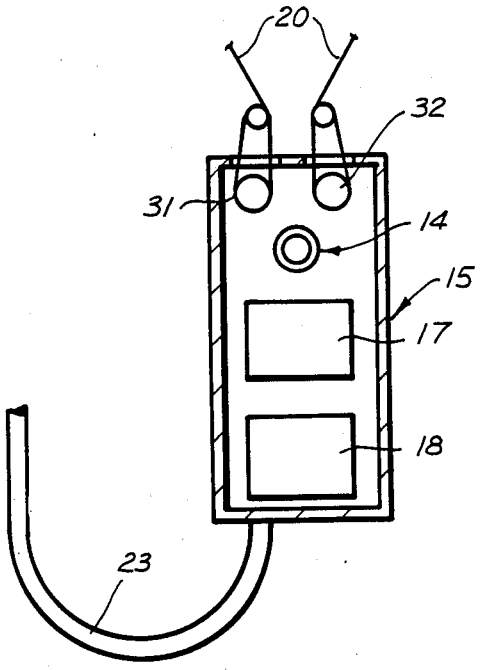
FIG. 3 is an enlarged schematic view of the movable temperature sensor as seen along line 3—3 in FIG. 2.
Figure 4:
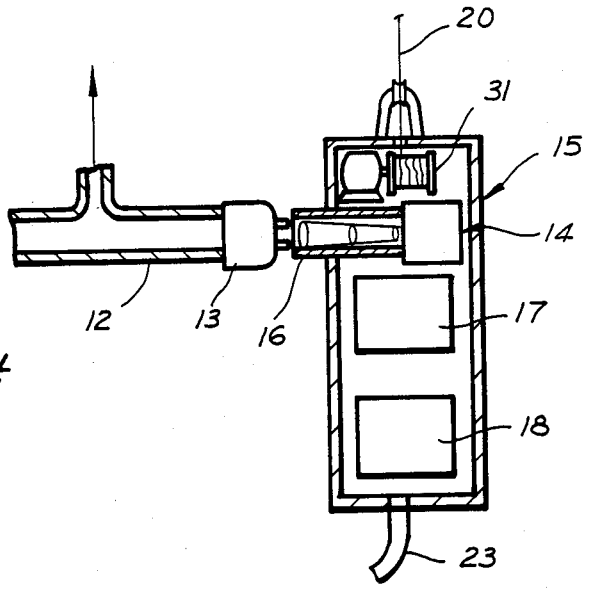
FIG. 4 is an enlarged schematic sectional view taken along line 4—4 in FIG. 1.

This disclosure is concerned with an apparatus for on-line temperature monitoring of the reactor coolant as it exits the process tubes in nuclear reactors. The power level of such reactors is now based on power limit calculations using the measured coolant flow rate and the difference between the measured bulk coolant inlet temperature and the measured coolant outlet temperature for the individual tubes.

This invention arose to improve upon the reliability and accuracy of Resistance Temperature Detectors used on outlet assemblies of the N-Reactor at Hanford, Washington. The tube outlet temperatures in this reactor are measured by Resistance Temperature Detectors on the outlet jumpers with a $\pm 8°$ F. tolerance. The resulting power calculations, to be conservative, are based upon the assumption that the Resistance Temperature Detectors are at all times reading 8° F. too low. Thus, the individual tube power limits, as the reactor is currently operated, arbitrarily limit the power supplied by the reactor at about 6% (8/130) below the level which would be necessary if the actual outlet temperature were accurately known. This assumes an average temperature difference of 130° F. between the inlet and outlet of each process tube. Furthermore, because a Resistance Temperature Detector which indicates temperatures beyond the $\pm 8°$ F. tolerance is assumed to be defective, those that indicate readings outside this tolerance must be replaced. The replacement of Resistance Temperature Detectors is a high personnel radiation exposure task. When a substantial number of Resistance Temperature Detectors malfunction, particularly during start-up of the reactor, the entire reactor operation must often be shut down. This is an extremely expensive process to undertake simply due to the breakdown of monitoring devices.

According to this disclosure, a remotely controlled device can be used to position a more accurate temperature sensor at any selected process tube to measure the individual tube outlet temperature while the reactor is operating. The resulting measurements can be used for recalibrating the stationary Resistance Temperature Detectors. Using a more accurate sensor to periodically calibrate the stationary temperature detectors would allow the power produced by the reactor to be significantly increased and would greatly reduce the need to replace the individual temperature detectors.

In general, the apparatus consists of a suspended or crawler enclosure containing a temperature sensor that can be selectively coupled to any individual process tube end arranged about a supporting reactor wall. As used herein, the reference to "coupling" the movable temperature sensor to one end of a selected process tube might involve physical contact or engagement between the sensor and process tube, or the positioning of the sensor in such proximity to the process tube as to functionally permit the sensor to measure the process to operating temperature without physical contact.

The concepts of this apparatus will be more clear in view of the schematic illustration provided in FIGS. 1–4. In these drawings, a vertical reactor wall 10 supports a plurality of individual process tubes 11 arranged in an array of vertical columns and horizontal rows. Because the elevated outlet temperature of the process tubes is critical in assuring that the maximum liquid temperature within the tube is below the temperature at which boiling will occur in the outlet piping, this invention will be described as directed to the monitoring of the outlet end of each process tube 11.

The outlet end of each process tube includes an outlet nozzle 12 leading to common risers (not shown) for the coolant circulated through the process tubes. The outlet piping for each tube 11 is typically provided with a stationary temperature detector (not shown). These detectors currently have a degree of reliability and accuracy which requires temperature calculation based upon conservative and relatively large tolerances, as described above.

The movable temperature sensor 14 is located within an insulated enclosure 15. The sensor 14 includes an extension 16 that protrudes outward from enclosure 15 to facilitate coupling to the end cap 13 of a selected process tube 11. Enclosure 15 also houses an electronics module 17 and a cooling unit 18 designed to maintain the electronics module 17 at a safe operating temperature during use within the elevated temperatures encountered adjacent to the wall 10.

The enclosure 15 is suspended by two cables 20 leading individually to transverse spaced points 21 and 22 spanning the width of the process tube rows and positioned above the process tube columns (FIG. 1). By operating one or both of two winches 31, 32, to control the respective lengths of cables 20, the enclosure 15 and sensor 14 can be moved to the outer end of any selected tube 11.

The enclosure 15 is also provided with a trailing instrumentation and electrical cable 23 leading to remote monitoring equipment (not shown) for recording operation of the reactor components.

One purpose of the sensor 14 is to back up the operation of the individual temperature detectors that typically monitor output coolant temperatures in the process tubes. By moving sensor 14 into a position coupled with the end cap of a process tube evidencing abnormal temperature readings, one can verify or correct the indicated temperature and determine whether the faulty indications are the result of reactor operation or monitoring equipment failure. This can be quickly accomplished without modifying normal reactor operation.

According to this disclosure, the movable temperature sensor 14 should have significantly greater reliability and accuracy then the reliability and accuracy of the stationary temperature detectors on the individual process tubes. The high costs involved in selecting and maintaining a highly accurate temperature sensor can be more easily justified because only one such unit is required to monitor large numbers of less accurate stationary temperature detectors. Examples of sensors that might be used as the movable temperature sensor 14 include infrared sensors, thermocouples, and Resistance Temperature Detectors. The specific sensors selected for this purpose can be subjected to a high degree of scrutiny and calibration to assure a high degree of reliability and accuracy during use.

Another function of this apparatus is to provide regular recalibration of the individual temperature detectors for the process tube outlet ends. A high degree of accuracy in the measurements provided by the temperature sensor 14 can easily be maintained by providing one outlet nozzle 12 on a preselected process tube with redundant thermocouples or other temperature monitoring devices having known high accuracy and precision. The sensor 14 can then be recalibrated at the preselected process tube as often as required to assure its high measurement accuracy for calibration of the temperature detectors associated with the remaining process tubes. If the outlet temperature of the process tubes is periodically measured with an on-line temperature monitoring device having an overall accuracy of ±2° F., the required conservative operating temperature for the coolant within the process tube can be reduced 6° F. (from 8° F. to 2° F.), resulting in substantially greater power output from the reactor. Such tolerances appear to be practical to obtain with existing Resistance Temperature Detector technology backed up by the recalibration ability provided by an accurate back up sensor 14.

The foregoing description of the preferred embodiment of the invention has been presented for purposes of illustration and description. It is not intended to be exhaustive nor to limit the invention to the precise step disclosed. Obviously, many modifications and variations are possible in view of the above teaching. The embodiment of the apparatus in detail was chosen and described in order to best explain the principles of the invention and its practical application so as to enable others skilled in this art to best utilize the invention. It is contemplated that various embodiments and modifications suited to a particular use will be utilized. It is intended that the scope of the invention be defined by the claims attached to this disclosure.

I claim:

1. In combination with a nuclear reactor having a plurality of coolant process tubes each having a corresponding end protruding outwardly from a wall of the reactor and provided with a stationary temperature detector:

monitoring means for remotely recording the temperature sensed by each of said temperature detectors;

a movable temperature sensor mounted on the wall of the reactor core;

remotely operated means operably connected between the wall of the reactor and said temperature sensor for selectively coupling the movable temperature sensor to one end of a selected process tube, the reliability and accuracy of said movable temperature sensor being greater than the reliability and accuracy of the stationary temperature detectors;

whereby the temperature indicated by use of the stationary temperature detector can be verified without modifying reactor operation or replacement of the stationary temperature detector associated with the selected process tube.

2. The apparatus of claim 1 wherein the wall of the reactor is vertical and the corresponding ends of the process tubes protrude from the wall in an array of vertical columns and horizontal rows;

said remotely operated means comprising:

two cables vertically suspending the movable temperature sensor from two spaced points on the reactor spanning the width of the process tube rows and positioned above the process tube columns;

and means for moving said movable temperature sensor by effectively lengthening or shortening one or both of said cables relative to the movable temperature sensor.

3. The apparatus of claim 1 wherein one end of a preselected process tube is instrumented with redundant temperature detectors of known accuracy for periodic recalibration of the movable temperature sensor by coupling it to said preselected process tube.

* * * * *